(12) United States Patent
Trani et al.

(10) Patent No.: US 12,286,253 B2
(45) Date of Patent: Apr. 29, 2025

(54) METHOD FOR GROUPING A PLURALITY OF OBJECTS TO BE MOVED

(71) Applicant: Giorgio Trani, Venice (IT)

(72) Inventors: Giorgio Trani, Venice (IT); Marion Sterner, Venice (IT); Federico Cariolaro, Vicenza (IT)

(73) Assignee: Giorgio Trani, Venice (IT)

( * ) Notice: Subject to any disclaimer, the term of this patent is extended or adjusted under 35 U.S.C. 154(b) by 0 days.

(21) Appl. No.: 18/027,867

(22) PCT Filed: Sep. 22, 2021

(86) PCT No.: PCT/IB2021/058652
§ 371 (c)(1),
(2) Date: Mar. 22, 2023

(87) PCT Pub. No.: WO2022/070005
PCT Pub. Date: Apr. 7, 2022

(65) Prior Publication Data
US 2023/0339635 A1    Oct. 26, 2023

(30) Foreign Application Priority Data

Sep. 30, 2020   (IT) .................... 102020000023068

(51) Int. Cl.
| | |
|---|---|
| *B65B 11/04* | (2006.01) |
| *B65B 11/58* | (2006.01) |
| *B65B 41/12* | (2006.01) |
| *D21H 27/10* | (2006.01) |

(52) U.S. Cl.
CPC .......... *B65B 11/045* (2013.01); *B65B 11/585* (2013.01); *B65B 41/12* (2013.01); *D21H 27/10* (2013.01)

(58) Field of Classification Search
CPC ... B65B 11/025; B65B 11/045; B65B 11/585; B65B 41/12; D21H 27/10; D21H 27/00; B32B 27/10; B32B 27/12; B32B 2307/7265; B32B 2307/50; B32B 2553/00

See application file for complete search history.

(56) References Cited

U.S. PATENT DOCUMENTS

| | | | |
|---|---|---|---|
| 4,458,467 A | 7/1984 | Shulman et al. | |
| 4,590,737 A | 5/1986 | Rosenthal et al. | |
| 4,834,838 A * | 5/1989 | Klowak ................. | D21H 5/24 |
| | | | 162/111 |

(Continued)

FOREIGN PATENT DOCUMENTS

| | | | | |
|---|---|---|---|---|
| EP | 0086045 A2 * | 8/1983 | ............ | B65B 11/04 |
| FR | 2675466 A1 | 10/1992 | | |

(Continued)

*Primary Examiner* — Thomas M Wittenschlaeger
(74) *Attorney, Agent, or Firm* — Carmel Patent Agency; Robert Ballarini

(57) ABSTRACT

Method of grouping a plurality of objects to be handled includes positioning the objects on a support surface and wrapping the objects and support surface with a tape of non-creped paper material. The tape having an extensibility of at least 6% in the longitudinal direction and 6% in the transverse direction and is maintained before or during the winding of the tape in a state of tension which causes it to extend to a lesser extent than its maximum extensibility.

10 Claims, 1 Drawing Sheet

(56) References Cited

U.S. PATENT DOCUMENTS

| | | | | |
|---|---|---|---|---|
| 5,797,246 | A | * | 8/1998 | Martin-Cocher ....... B29C 55/06 53/399 |
| 6,024,832 | A | * | 2/2000 | Trani ...................... D21F 11/00 162/99 |
| 2014/0109524 | A1 | * | 4/2014 | Nelson .................. B65B 67/085 53/140 |
| 2015/0232214 | A1 | * | 8/2015 | Suolahti .................. B65B 11/02 53/410 |
| 2020/0407089 | A1 | * | 12/2020 | Jones ...................... B65B 51/02 |

FOREIGN PATENT DOCUMENTS

| | | | |
|---|---|---|---|
| WO | 9631647 | A1 | 10/1996 |
| WO | 2004029361 | A1 | 4/2004 |
| WO | 2011151705 | A1 | 12/2011 |
| WO | 2015011551 | A1 | 1/2015 |

* cited by examiner

METHOD FOR GROUPING A PLURALITY OF OBJECTS TO BE MOVED

FIELD OF THE INVENTION

The present invention relates to a method of grouping a plurality of objects to be moved.

BACKGROUND

Methods for preparing a plurality of objects for their movement in a grouped condition are known in the packaging sector. In general, they foresee to arrange the objects on a pallet (pallet) in an orderly manner, so as to make them occupy the least possible space and then to be able to then wrap them with a continuous tape (stretch wrapping) which has the function of keeping them grouped between them and to form a whole with the pallet, which can be moved easily and efficiently in storage and transport operations.

In general, to carry out stretch wrapping, polymeric films of elastically yielding material or heat-shrinkable material are used, which combine the advantages of high mechanical resistance with the advantages of their easy adaptability to the even irregular shape of the objects to be wrapped.

The materials usually used to make these polymeric films are various and include in particular polyolefins, high density polythene (HDPE), low density polythene (LDPE) and others. These films are packaged in rolls from which the tape is then unwound at the time of use, which is wrapped around the objects placed on the pallet and which, thanks to its elastic compliance or its heat shrinkage, forms a sort of multilayer sheath around the objects and also around the pallet, forming a whole with it and making the handling of the assembly safe and rapid.

The known methods of wrapping packages placed on a pallet, which is generally loaded in height, provide for the polymeric film to be wrapped with a certain tension around the objects themselves, and this is by moving the wrapping machine with the roll of polymeric film around it to the loaded pallet, kept stationary, both by rotating the pallet placed on a rotating support and keeping the machine that supports the polymeric film still.

Regardless of the wrapping technique adopted, it still provides that the polymeric film is wrapped several times around the loaded pallet, both to form the multilayer sheath, and because generally the height of the loaded pallet is greater than the height of the polymeric film, which it must therefore be distributed during winding so as to cover the entire height of the loaded pallet with the various turns (loops).

The growing attention towards environmental protection and the foreseeable entry into force of regulations that will increasingly limit the use of disposable plastic films, increasingly push the use of biodegradable materials such as recycled and non-recycled paper tapes, derived from recycled cellulose fibers, bagasse or grass or straw fibers, etc., with the use of wrapping machines used today with plastic material.

However, attempts to use paper tapes have not given satisfactory results as the tension with which the paper tape should be wrapped around the packages to keep them firmly together and the irregular shape, which is very often present, cause frequent breaks in the tape of paper and therefore is practically unsuitable.

FR2675466 already suggests wrapping a load with an extendable crepe paper tape. However, it is well known that crepe paper presents over its entire surface small folds which develop transversely to the longitudinal direction of the paper tape, which cannot be stretched in a transverse direction, but only in a longitudinal direction, since its elongation is due to the relaxation of these transverse folds, which have been created with traditional techniques. Consequently, the technique suggested by this prior document can find application in the case of regular shaped loads but not of irregularly shaped loads with lateral protrusions and recesses, such as those consisting for example of a plurality of objects having different shapes, placed on a pallet.

Furthermore, since the crepe paper and in particular the crepe paper with a high elongation coefficient can hardly be printed, given the presence of the showy folds, the packages that can at most be obtained according to FR2675466 are generally anonymous.

SUMMARY

The purpose of the invention is to overcome the limits that the traditional technique sets, and to be able to wrap a load, consisting of objects possibly placed on a pallet, with a more ecological material and with a lower environmental impact compared to plastic material.

Another object of the invention is to be able to wrap a load consisting of objects possibly placed on a pallet with a cheaper material than plastic.

Another object of the invention is to be able to wrap a load consisting of objects possibly placed on a pallet and thus form a customizable packaging.

Another object of the invention is to be able to wrap a load formed by objects possibly placed on a pallet with the use of traditional wrapping machines for polymeric films as such or with minimal modifications, which concern for example the setting of the operating parameters of the wrapping.

All these objects and others that will result from the following description are achieved according to the invention with a method of grouping a plurality of objects to be handled as defined in the appended claims.

BRIEF DESCRIPTION OF THE DRAWINGS

The present invention is further clarified hereinafter in some of its preferred forms of practical embodiments reported for purely illustrative and non-limiting purposes with reference to the attached table of drawings, in which.

DETAILED DESCRIPTION OF THE PREFERRED EMBODIMENTS

As can be seen from the figures, the method according to the invention is finalized to wrap a plurality of objects 2 placed on a support surface and preferably on a pallet 4 near a dispenser (not shown) of a paper tape 6, unwound from a roll 8, supported by the dispenser.

The tape 6 is made with non-creped extensible paper (uncreped), i.e. with paper that is obtained with methods described for example in EP 0824619, EP 2576201 and EP 3024977 and in which the extension is the result of a sliding of the fibers that form it and which had previously been micro-cramped both in the longitudinal direction and in the transverse direction. For the purposes of this particular use, the extensible paper must be able to have a degree of extensibility of at least 6% in the longitudinal direction and 6% in the transverse direction, and preferably at least 10% in the longitudinal direction and at least 7% in the transversal.

Figure 1:
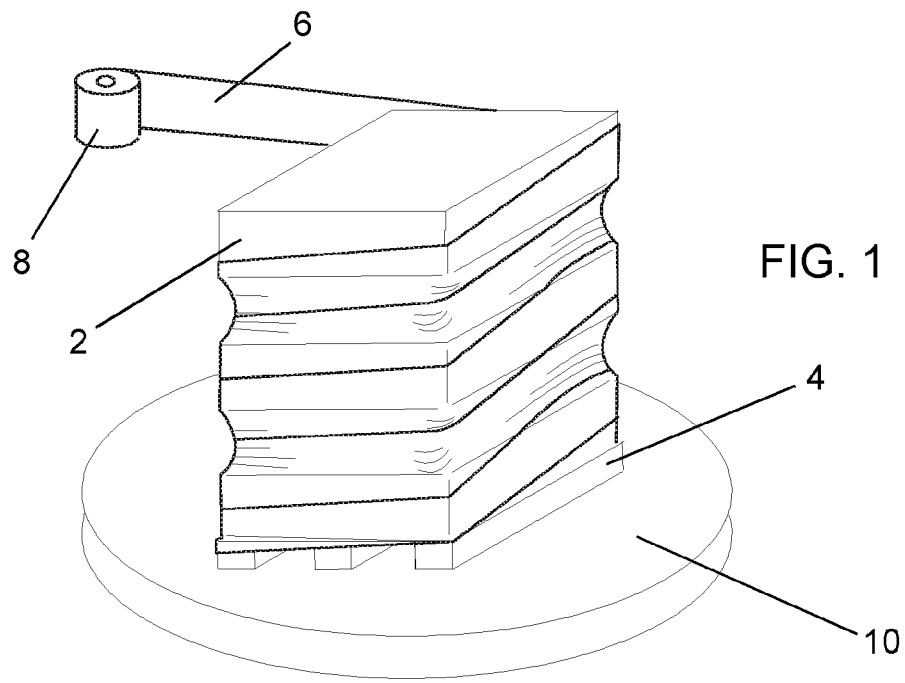
FIG. 1 shows in a perspective and schematic view a plant for wrapping a load consisting of objects placed on a pallet with an extensible paper tape, FIG. 2 always shows it in a schematic view in a different embodiment, and FIG. 3 schematically shows a tape presenting folded edges being unwound from a roll.
Figure 2:
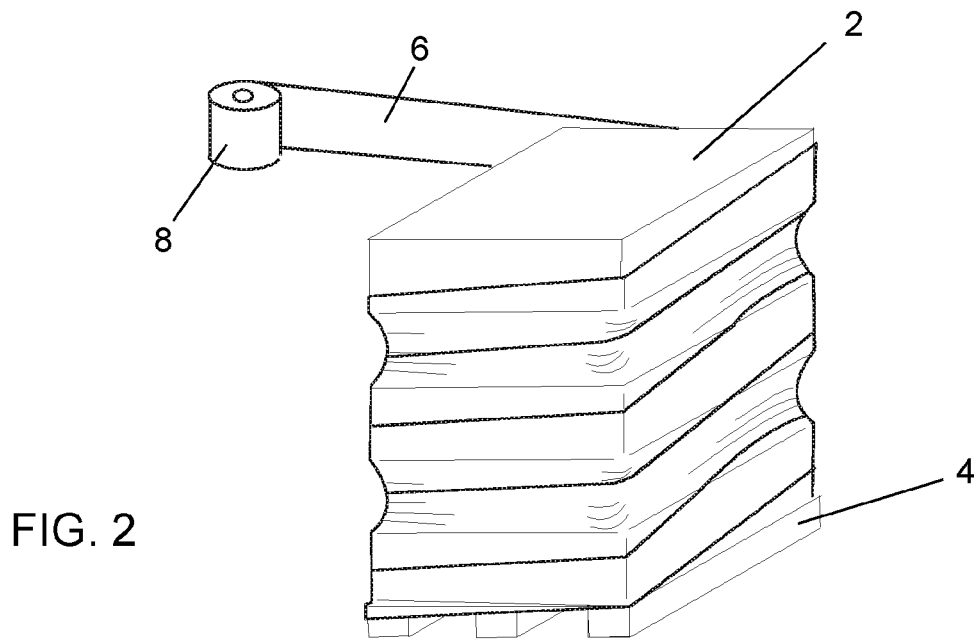

The dispenser on which the roll 8 of extensible paper is mounted can be a traditional fixed dispenser of the paper tape 6 which is unwound from the roll 8, to be wrapped around the objects 2 placed on the pallet 4, which in turn is placed on a rotating support 10, which rotates the load to be packed and thus causes the unwinding of the extensible paper tape 6 from the roll 8 and its winding around the objects 2 (FIG. 1).

Alternatively, the dispenser can be a traditional wrapping machine which supports the roll 8 and is provided with means for its movement around the pallet 4, which is fixed, and in this way is wrapped with the objects 2 by the belt 6 following the rotation of the wrapping machine around the load to be packed.

In both cases there is a winding of the extensible paper tape 6 around the objects 2 and thanks to its extensibility both in the longitudinal direction and in the transversal direction and to the controlled tension to which it is subjected during the winding, an effective adaptation of the tape itself to the even irregular shape of the objects 2, with the creation of a multilayer of paper which covers them and holds them firmly together during the subsequent handling of the packaging.

In order to be able to follow the irregularities in the load formed by the leaning and/or overlapping objects 2, it is necessary that the paper 6 has high characteristics of both longitudinal and transversal extensibility and the experimental tests carried out have allowed to define that an effective wrapping action requires that the paper tape has a degree of extensibility minimum of 6% both in the longitudinal direction than in the transverse direction, but preferably a degree of extensibility of at least 10% in the longitudinal direction and at least 7% in the transverse direction.

In step of application of the extensible paper tape 6, in the machine that supports the roll 8 to be unwound, the tape itself can be subjected to a slight tension in the longitudinal direction before its winding on the objects 2 possibly positioned on the pallet 4, or it can be stretched during its winding, thanks to its maintenance in a state of slight tension.

In both cases, when the extensible paper tape 6 is made to adhere to the objects 2, its extensibility both in the longitudinal and in the transverse direction makes it adhere to the objects themselves, adapting to their irregularities.

It is however foreseen that during winding the extensible paper tape 6 does not reach its maximum elongation, but still retains a certain degree of extensibility, necessary to avoid tearing during the handling and transport of the pallet 4.

Figure 3:
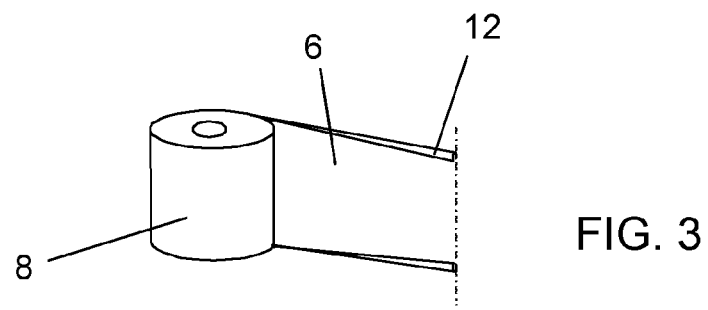

It is also foreseen that during the unwinding of the tape 6, it can also be subjected in the machine that supports the roller 8 at a folding of its longitudinal edges 12 with tape reinforcing function itself (FIG. 3).

It is also provided that the winding of the objects 2 and the pallet 4 with the extensible paper tape 6, which is arranged to form loops with a vertical axis, i.e. perpendicular to the support surface of the objects 2, consisting of the upper surface of the pallet 4, can be followed by a 90° overturning of the pallet itself, so that the winding can continue with the formation of loops substantially orthogonal to the previous ones. In this way, a more complete wrapping is obtained and its greater resistance to the stresses due to the handling of the packaging, as well as a further stabilization of the objects 2.

In other cases it is envisaged to integrate the wrapping carried out with stretch paper with a further wrapping carried out with a polymeric film that protects it from water and bad weather, in case the pallet has to be placed outside. It should be considered that according to this embodiment the plastic material has not been completely eliminated but on the one hand it is greatly reduced and on the other hand it is easily separable and disposable. Furthermore, biodegradable films can also be used in this context.

In order to make the layers of paper that wrap the objects 2 repellent to water and/or grease, the extensible paper can also be impregnated and/or added with anti-grease and anti-water agents, known per se, which can be introduced into the dough, with which the extensible caste tape 6 will be formed, or they can be applied by spraying or rolling or with other traditional techniques to the already formed extensible paper tape.

The surface of the extensible paper tape can be smooth and therefore easily printable, or it can be structured and in particular it can be locally deformed to give rise, for example, to protrusions, which favor the adhesion between adjacent and at least partially overlapping layers.

For some uses it may be convenient to couple the extensible paper tape 6 with a polymeric film or to apply a layer of glue or sealing material to the paper tape 6, both hot and cold, and this over the entire surface of the paper tape. extensible or on localized areas, with a technique similar to register printing.

At the end of the winding the end of the extensible paper tape can be stabilized in its position, for example with an adhesive layer.

In order to avoid in any case tearing and damage to the extensible paper tape 6 due to possible interference with the edges of the bed 4 and/or with protruding parts of the objects 2 placed on it, the invention also provides for covering said edges and said protruding parts with angles of biodegradable material.

Extensible papers advantageously usable for this specific use can have weights ranging from 25 to 250 g/m2, preferably between 40 and 100 g/m2.

The following examples will further clarify the invention.

Example 1

A pallet 4 of the Europallet type with four levels of packages made up of six bottles of soft drinks each is wound with a traditional wrapping machine, on which a roll 8 of extensible paper 6 with an extensibility of 8% both in the longitudinal direction and in the transverse direction.

The wrapping machine is fixed while the pallet 4, on which the packages to be packed are placed, is placed on a rotating platform 10, which with its rotation unwinds the paper tape 6 from the roll 8.

The paper roll 8 is kept slightly braked, so that the tape 6 is kept during its unwinding in a state of tension sufficient to cause, together with the extensibility in the transverse direction, a complete adaptation of the paper to the irregular shape and to the lateral roughness present in the packs 2 placed on the pallet 4.

The tension of the paper tape 6 during winding is kept at values suitable to cause an extension of the paper itself below its maximum extensibility, so that even after its winding it still retains a certain margin of extensibility, necessary for avoid tearing during the handling of the wrapped pallet.

Example 2

Objects 2 of various shapes and sizes are placed on a pallet 4 of the Europallet type, which are then wrapped with a tape 6 of extensible paper with longitudinal extensibility values of 38% and transversal extensibility of 10%.

In this case the pallet 4 remains fixed while the wrapping machine is moved around it to wrap it with the extensible paper tape 6.

The greater extensibility of the paper allows its easier adaptation to the irregular shape of the objects 2 placed on the pallet 4 and ensures however, their stabilization on it during the movements.

Example 3

Several layers of beverage cans 2 are placed on a pallet 4, which are then wrapped with an extensible paper tape 6 having an extensibility of at least 15% in the transverse direction and at least 20% in the longitudinal direction.

Also in this case, thanks to the extensibility of the card 6, it adapts to the shape of the load placed on the pallet 4 and stabilizes it during its movements.

The load already wrapped with the extensible paper 6 can then be advantageously wrapped with a further possibly biodegradable film, which protects the paper 6 and the objects 2, wrapped by it, from rain, if the load is to be placed outdoors.

In this case, the undesired presence of a polymeric film is reduced both by the small quantity of plastic material and by its easy separability from the paper and its equally easy disposability.

From what has been said it is clear that the method according to the invention is presented particularly advantageous and more specifically:

It uses an ecological material with a low environmental impact

It uses a recycled and low-cost material, it uses a printable material and thus allows you to customize the packaging with advertising writings and/or indications useful for storage, it allows to use traditional polymeric film vending/wrapping machines for its application.

The invention claimed is:

1. Method of grouping a plurality of objects (2) to be moved comprising:

providing a tape of non-creped paper material, which has been micro-cramped in both the longitudinal and the transverse directions, wherein the tape has an extensibility between 6% and 38% in the longitudinal direction and an extensibility between 6% and 15% in the transverse direction;

positioning said objects (2) on a pallet (4); and wrapping said objects (2) and said pallet (4) with said tape of non-creped paper material (6) wherein the extensibility of said non-creped paper material in the longitudinal direction and in the transverse direction is maintained during the wrapping of said tape in a state of tension, such that the non-creped paper material (6) extends to a lesser extent than its maximum extensibility.

2. The method according to claim 1 wherein the tape of non-creped paper material (6) has an extensibility between 10% and 38% in the longitudinal direction and extensibility between 7% and 15% in the transverse direction.

3. The method according to claim 1, wherein before wrapping said objects (2) protruding parts thereof, intended to come into contact with said tape of non-creped extensible paper material (6), are protected with corner pieces of biodegradable material.

4. The method according to claim 1, wherein said pallet (4) and said objects, already wrapped with said tape of non-creped extensible paper material (6), are wound with a polymeric film.

5. The method according to claim 1, wherein said tape (6) of non-creped extensible paper material is obtained with a mixture in which waterproofing agents and/or anti-grease have been introduced.

6. The method according to claim 1, wherein said tape (6) of non-creped extensible paper material is impregnated with waterproofing agents and/or anti-grease agents.

7. The method according to claim 1, wherein said tape (6) of non-creped extensible paper material comprises at a surface thereof, areas, in which sealing materials are present.

8. The method according to claim 1, wherein said tape (6) of non-creped extensible paper material, comprises on a surface thereof, localized reliefs.

9. The method according to claim 1, wherein said tape of non-creped paper material (6) is associated with a thin waterproof film.

10. The method according to claim 1, wherein said tape of non-creped paper material (6) has a basis weight between 25 g/m$^2$ and 250 g/m$^2$.

* * * * *